Sept. 4, 1956 G. H. FATHAUER 2,761,972

FREQUENCY STABILIZING CIRCUIT

Filed March 10, 1953

INVENTOR.
GEORGE H. FATHAUER
BY
Lockwood, Galt, Woodard, & Smith
ATTORNEYS

United States Patent Office 2,761,972

Patented Sept. 4, 1956

2,761,972

FREQUENCY STABILIZING CIRCUIT

George H. Fathauer, Beech Grove, Ind., assignor, by mesne assignments, to Thompson Products, Inc., Euclid, Ohio, a corporation of Ohio Application March 10, 1953, Serial No. 341,526

3 Claims. (Cl. 250—36)

The present invention relates to a frequency stabilizing circuit and more particularly to an automatic frequency control circuit for use in television scanning systems.

In the field of television and more particularly "closed-circuit" television for industrial and the like purposes, it is desirable that the equipment be inexpensive, simple in its design and operation, yet function in a reliable and efficient manner, these features being in direct contrast with entertainment television in which such economies are not important.

It is therefore an object of this invention to provide in a television system an automatic frequency control circuit of relatively simple and economical design for controlling the camera scanning frequency.

It is another object of this invention to provide a simple and unique frequency stabilizing system which produces a direct current biasing potential for an oscillation frequency generator.

It is still another object of this invention to provide an automatic frequency control circuit for comparing the phase difference between two pulsating voltage signals and which will produce a D. C. output voltage corresponding to the phase relationship of said signals.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
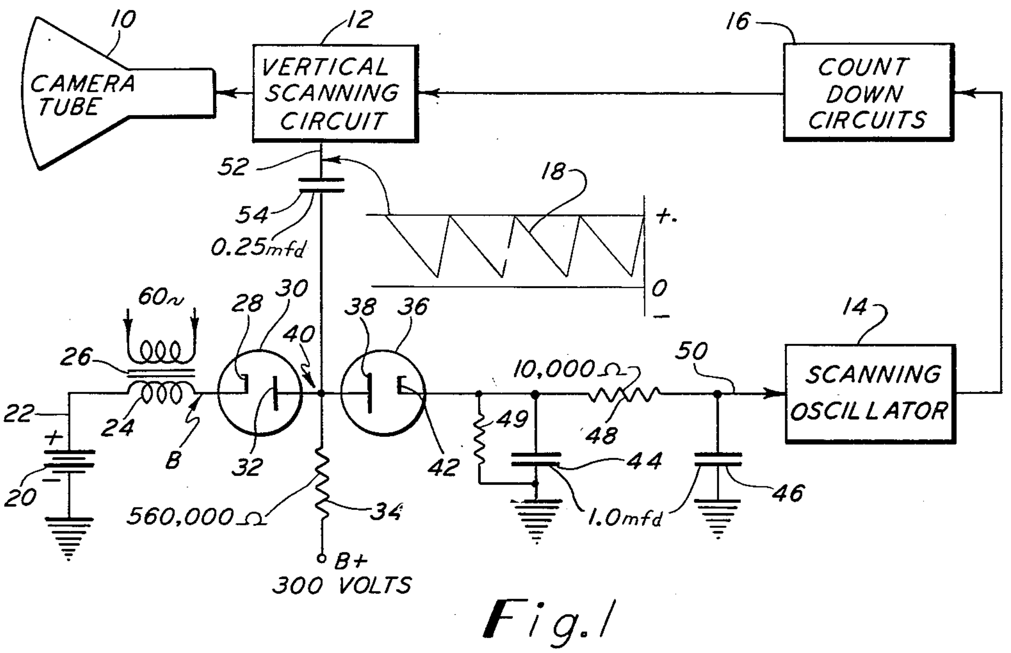
Fig. 1 is a circuit diagram of one embodiment of this invention.

Referring to the drawings, a television camera unit is shown as being comprised of a camera tube 10, a vertical scanning circuit 12 which supplies scanning impulses to the tube 10, and a scanning oscillator 14 which generates a frequency of 31.5 kilocycles, the conventional scanning oscillator frequency. The signal voltage of the oscillator 14 is fed to the usual count down circuits 16 which ultimately reduces the frequency of the scanning oscillator to a frequency which may be utilized by the conventional vertical scanning circuit 12 for producing a sawtooth wave 18 having a period of $\frac{1}{60}$ of a second. All of the circuits described in the foregoing and the signals produced thereby are of conventional form, the signal fed to the camera tube serving to provide the usual vertical scansion.

Since in order to achieve accurate synchronism between the camera unit and the television receiver, some means must be provided for accurately determining the frequency of the scanning oscillator 14, and this means is provided by this invention which, as in the case of conventional circuits, utilizes power line frequency which is held within accurate frequency limits.

The automatic frequency stabilizing circuit of this invention is comprised of a source of D. C. potential 20 having its negative terminal connected to ground and its positive terminal connected by means of a wire 22 to one end of a secondary coil 24 of a transformer 26. The primary coil of this transformer 26 is connected to the usual power line source of 60 cycle alternating current. The other end of the transformer winding 24 is connected to the cathode 28 of a diode 30. The anode 32 is connected to the upper end of a signal-developing circuit or resistor 34 which is connected to a source of positive D. C. voltage as shown. Another diode 36 has an anode 38 connected to the anode 32 of the tube 30, the juncture of the connections between the anode 32, resistor 34, and anode 38 constituting an input circuit generally indicated by the reference numeral 40. The cathode 42 of the diode 36 is conductively connected to a D. C. filter circuit consisting of the capacitors 44 and 46 and the resistor 48 connected therebetween. A load resistor 49 having a relatively high resistance, such as one megohm, is bridged across condenser 44. The lead 50 extends from this filter circuit and is connected to the input circuit of the scanning oscillator 14. This oscillator 14 may be of the usual design in which a change in bias potential on the tube thereof produces a change in the oscillator frequency. The lead 50 supplies a bias potential for this oscillator which, as just mentioned, serves to control the frequency of the latter.

The scanning signal produced by the vertical scanning circuit 12, which may have the saw-tooth wave shape 18 as explained previously, is fed by means of a connection 52 and a coupling condenser 54 to the input circuit 40 between the two diodes 30 and 36.

While high vacuum diodes 30 and 36 have been described in the foregoing, it will be understood from the foregoing explanation and the following explanation of operation that these diodes may be in the form of selenium rectifiers or other similar types of diodes well known to the art. Since economy and simplicity of design constitute important factors in the present invention, it is preferable to use selenium rectifiers for the diodes thereby making it unnecessary to provide heater voltages.

Figure 2:
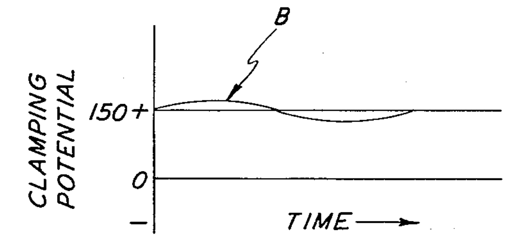
Figure 2 is the waveform of one signal voltage utilized in the foregoing circuit.

In the operation of the circuit, the series connected battery 20 and transformer 26 produce an alternating wave "B" such as that appearing in Fig. 2. The potential of the battery 20 serves as an axis about which the voltage produced by the transformer alternates, and in the preferred embodiment of this invention, the value of the battery voltage is 150 volts. The value of the alternating voltage impressed or added to this D. C. battery potential is not critical, such value being determined by the D. C. control voltage needed at point 50 to control the frequency of oscillator 14. In the instant embodiment, this value is 6.3 volts A. C. (R. M. S.), and the D. C. voltage at point 50 is approximately the same.

This positive alternating voltage of Fig. 2 is impressed on the cathode 28 of the diode 30, and serves as an alternating bias voltage for determining the conduction characteristics of the diode.

The scanning voltage 18, produced by the scanning circuit 12, preferably has a reference level of positive potential which exceeds the sum of the maximum instantaneous value of alternating voltage produced by the transformer 26 and the voltage of the battery 20.

With the scanning signals applied to the input circuit 40 and across the condenser 54, it will be seen that at any instant of time, the signal appearing on the anode 38 cannot have a magnitude greater than the maximum instantaneous value of bias voltage as provided by the A. C. potential 20, 24. The waveform resulting from the combination of these two signals and applied to the anode 38 of the diode 36 appears in solid line form in Fig. 3, the bias voltage serving to "clamp" the maximum amplitude of the saw-tooth signal as shown. Stating the foregoing in other words, the reference A. C. potential produced by the series connected battery 20 and transformer 26 serves to clamp the peak instantaneous value of the signals 18 to that of the instantaneous value of the A. C. reference voltage.

The resulting compositive waveform signal is now rectified by the diode 36 and fed to the filter circuit 44, 46, 48, the filtered voltage being fed to the line 50 in substantially pure direct current form.

Figure 3:
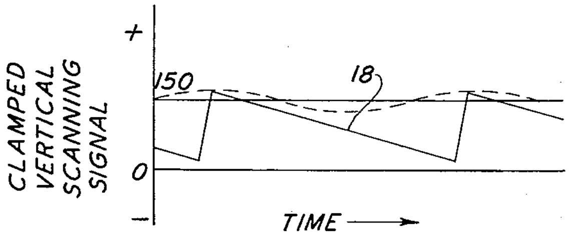
Fig. 3 is a graph of another waveform produced by the foregoing circuit.

In the initial adjustment of the oscillator 14, the circuit 16, and the vertical scanning circuit 12, the period of the scanning signal 18 is adjusted, as closely as possible, to have a period of 1/60 of a second. Since exact adjustment to 1/60 of a second is not possible because of varying circuit conditions due to causes well known to the art, the two signals as shown in Fig. 3 will tend to shift in phase relative to each other. When this occurs, the average voltage of the wave applied to the anode 38 changes, by reason of the change in "clamped" amplitude of the saw tooth wave, with the result that the D. C. potential appearing at the line 50 also changes thereby altering the bias of the tube in the oscillator 14. This alteration in oscillator bias now causes a frequency change which may be observed in the output circuit 52 of the vertical scanning circuit.

It will thus be seen that since a difference in phase between the scanning circuit signal 18 and the reference signal voltage of Fig. 2 will produce a different bias potential for the oscillator 14, an effective means is available for fixing the oscillator frequency with respect to power line frequency, any tendency of the oscillator frequency to shift being opposed by a correcting change in bias potential produced by the rectifier 36 and the associated filtering circuit.

Figure 4:
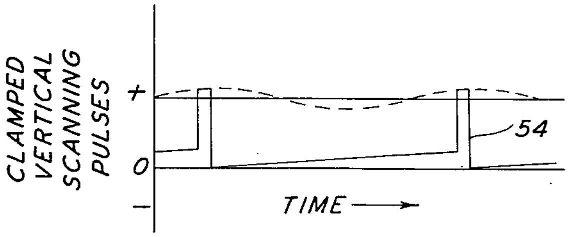
Fig. 4 is a graph of a waveform produced by the circuit of Fig. 1 in slightly modified form.

In some conventional circuits, saw-tooth waves such as those 18 are not used, but instead pulses such as those 54 of Fig. 4 are generated. The action of the foregoing described circuit is the same regardless of whether rectangular pulses 54 or saw-tooth waves 18 are used, since the positive reference alternating voltage B serves to clamp the scanning impulses at the proper height.

What is claimed is:

1. In an automatic frequency control system or the like, a phase sensing circuit for developing a control potential which varies in accordance with variations in the relative phase of a pair of signals, comprising: a first uni-directional conduction device having first and second terminals, a first capacitor having one terminal connected to said first terminal, means for applying a first signal between the other terminal of said first capacitor and a circuit point, means applying a second signal between said second terminal and said circuit point, one of said signals having a generally sinusoidal form and the other of said signals having sharp peaks of such polarity as to rapidly change the charge of said first capacitor through said uni-directional conduction device during a short time interval in each cycle, the charge of said first capacitor established during said short time interval being sufficient to prevent conduction through said device during the remaining portion of each cycle, a second capacitor having one terminal connected to said circuit point, and a second uni-directional conduction device connected between the other terminal of said second capacitor and said first terminal of said first uni-directional conduction device and arranged to conduct current in a direction to charge said second capacitor during conduction of said first uni-directional conduction device.

2. In an automatic frequency control system or the like, a phase sensing circuit for developing a control potential which varies in accordance with variations in the relative phase of a pair of signals, comprising: a first uni-directional conduction device having first and second terminals, a first capacitor having one terminal connected to said first terminal, means for applying a first signal between the other terminal of said first capacitor and a circuit point, means applying a second signal between said second terminal and said circuit point, one of said signals having a generally sinusoidal form and the other of said signals having sharp peaks of such polarity as to rapidly change the charge of said first capacitor through said uni-directional conduction device during a short time interval in each cycle, the charge of said first capacitor established during said short time interval being sufficient to prevent conduction through said device during the remaining portion of each cycle, a second capacitor having one terminal connected to said circuit point, a second uni-directional conduction device connected between the other terminal of said second capacitor and said first terminal and arranged to conduct current in a direction to charge said second capacitor during conduction of said first uni-directional conduction device, and a direct current bias source connected in series with said means for applying said second signal.

3. In a television system or the like including a scanning circuit for generating a signal having an abrupt peak in each cycle thereof, and an oscillator controlling said scanning circuit and arranged to be controlled in accordance with variations in a control potential, a phase sensing circuit comprising: a uni-directional conduction device having first and second terminals, a capacitor having one terminal connected to said first terminal, means for applying said signal from said scanning circuit between the other terminal of said capacitor and a circuit point, means applying a reference generally sinusoidal signal between said second terminal and said circuit point, and means coupled between said first terminal and said circuit point for applying a control potential to the oscillator, said signal from the scanning circuit having a polarity such as to rapidly change the charge of said capacitor through said uni-directional conduction device during a short time interval in each cycle, the charge of said capacitor established during said short time interval being sufficient to prevent conduction through said device during the remaining portion of each cycle.

References Cited in the file of this patent

UNITED STATES PATENTS

| | | |
|---|---|---|
| 2,201,978 | Bedford | May 28, 1940 |
| 2,209,507 | Campbell | July 30, 1940 |
| 2,250,284 | Wendt | July 22, 1941 |
| 2,389,025 | Campbell | Nov. 13, 1945 |
| 2,598,370 | Gruen | May 27, 1952 |